(12) United States Patent
Wack et al.

(10) Patent No.: US 7,648,009 B2
(45) Date of Patent: Jan. 19, 2010

(54) TORSIONAL VIBRATION DAMPER

(75) Inventors: Erwin Wack, Niederwerrn (DE); Christoph Sasse, Schweinfurt (DE); Jörg Sudau, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 421 days.

(21) Appl. No.: 11/634,404

(22) Filed: Dec. 6, 2006

(65) Prior Publication Data
US 2007/0131506 A1    Jun. 14, 2007

(30) Foreign Application Priority Data
Dec. 9, 2005    (DE)    ................ 10 2005 058 783

(51) Int. Cl.
*F16D 47/02*    (2006.01)
*F16D 47/06*    (2006.01)
*F16D 33/00*    (2006.01)
*F16D 3/66*    (2006.01)
*F16H 45/02*    (2006.01)

(52) U.S. Cl. .................... 192/3.29; 192/213.2
(58) Field of Classification Search .............. 192/213, 192/213.1, 213.2; 464/64.4, 68.7, 68.8
See application file for complete search history.

(56) References Cited

U.S. PATENT DOCUMENTS

| | | | |
|---|---|---|---|
| 4,138,003 A | 2/1979 | Malloy | |
| 4,422,535 A | 12/1983 | Ling | |
| 4,559,024 A | 12/1985 | Tamura et al. | |
| 4,668,207 A | 5/1987 | Koshimo | |
| 7,073,646 B2 | 7/2006 | Sasse et al. | |
| 2004/0050639 A1* | 3/2004 | Back et al. ............. | 192/3.28 |
| 2005/0115788 A1* | 6/2005 | Ackermann et al. ...... | 192/3.29 |

FOREIGN PATENT DOCUMENTS

DE    103 58 901    2/2005
EP    0 744 563    11/1996

OTHER PUBLICATIONS

Examination Report dated Feb. 21, 2007 issued for the corresponding European Application No. 06 02 4488.

* cited by examiner

*Primary Examiner*—Rodney H Bonck
(74) *Attorney, Agent, or Firm*—Cohen Pontani Lieberman & Pavane LLP

(57) ABSTRACT

A torsional vibration damper for a bridging clutch of a hydrodynamic clutch arrangement has a drive-side damping device, which can be brought into working connection with the housing of the clutch arrangement and is provided with a drive-side transmission element, which acts via a drive-side energy-storage group on an intermediate transmission element, and a takeoff-side damping device, which uses a takeoff-side group of energy-storage devices to establish a working connection between the intermediate transmission element and a takeoff-side transmission element, which is connected to a takeoff-side component of the hydrodynamic clutch arrangement. A predetermined stiffness ratio is obtained between the energy-storage devices of a first group and the energy-storage devices of a second group, and the energy-storage devices of the drive-side group have a stiffness different from that of the assigned energy-storage devices of the takeoff-side group.

18 Claims, 8 Drawing Sheets

TORSIONAL VIBRATION DAMPER

BACKGROUND OF THE INVENTION

The invention pertains to a torsional vibration damper on a bridging clutch of a hydrodynamic clutch arrangement.

A torsional vibration damper of this type is known from, for example, U.S. Pat. No. 7,073,646. The hydrodynamic clutch arrangement, realized in the form of a torque converter, is designed with a bridging clutch. The side of the clutch piston facing the clutch housing is provided with a friction surface, by means of which the piston can be brought into frictional connection by way of an intermediate plate with an opposing friction surface on the clutch housing. The bridging clutch establishes a working connection between the clutch housing, which is attached nonrotatably to a drive such as the crankshaft of an internal combustion engine, and the torsional vibration damper. That is, the connection is established between the clutch housing and a drive-side transmission element of the torsional vibration damper, this transmission element being attached nonrotatably but with freedom of axial movement to the intermediate plate. The drive-side transmission element cooperates with energy-storage devices of a drive-side energy-storage group and with cover plates serving as an intermediate transmission element to form a drive-side damping device. The cover plates, which are a certain axial distance apart, for their own part cooperate with energy-storage devices of a takeoff-side energy-storage group and with a takeoff-side transmission element to form a takeoff-side damping device. This is connected nonrotatably to a takeoff-side component such as a gearbox input shaft.

When considered as a free vibration system with a hydrodynamic clutch arrangement, the drive train of a motor vehicle can be broken down roughly into six masses. The drive with a pump wheel represents the first mass, the turbine wheel the second mass, the gearbox input shaft the third mass, the universal shaft and the differential the fourth mass, the wheels the fifth mass, and the vehicle as a whole the sixth mass. In the case of a free vibration system with n=six masses, it is known that there will be n−1 eigenfrequencies, i.e., 5 eigenfrequencies, the first of which pertains to the rotation of the overall vibration system and is unimportant with respect to the damping of vibrations. The rotational speeds at which the eigenfrequencies are excited depend on the number of cylinders of the drive, which is designed as an internal combustion engine. FIG. 2 shows a logarithmic plot of the amplitude-frequency curve at the turbine wheel of a hydrodynamic clutch arrangement.

In the effort to minimize fuel consumption, there is a trend toward closing the bridging clutch even at very low speeds to minimize the losses in the hydrodynamic circuit caused by slippage. For the bridging clutch, this means that it is closed at a frequency which may indeed be above the first and second eigenfrequencies EF1 and EF2 but still below the third and fourth eigenfrequencies EF3 and EF4. Whereas the first two eigenfrequencies EF1 and EF2 in the hydrodynamic circuit of the hydrodynamic clutch arrangement can be damped, the drive train can be excited to generate undesirable noise on passage through the third and fourth eigenfrequencies EF3 and EF4. The third eigenfrequency EF3 in particular can have very large amplitudes.

To return to U.S. Pat. No. 7,073,646, the torsional vibration damper according to FIG. 1, for example, has two damping devices, where the drive-side device is connected nonrotatably to the intermediate plate as a component of the bridging clutch, and where the takeoff-side damping device is connected nonrotatably to the gearbox input shaft as a takeoff-side component of the hydrodynamic clutch arrangement. The turbine wheel, functioning effectively as a mass element between the two damping devices, is connected to the intermediate transmission element.

Because of the way in which the turbine wheel is connected, the drive-side damping device acts as a torsional vibration damper (TD) of the type referred to in professional circles as a "standard TD" and, taken in itself, would make available the damping curve shown in FIG. 3. In the case of the amplitude-frequency curve at the turbine wheel of a hydrodynamic clutch arrangement shown schematically as a logarithmic plot in FIG. 2, a standard TD would lower both the amplitude of the third eigenfrequency EF3 and the amplitude of the fourth eigenfrequency EF4. For the third eigenfrequency EF3, however, the obvious elevation in rotational irregularity in the speed range around 1,500 rpm would remain, as can be seen in FIG. 3.

Because, in the case of the torsional vibration damper according to U.S. Pat. No. 7,073,646, the takeoff-side damping device and its takeoff-side transmission element are able to rotate relative to the turbine wheel attached to the intermediate transmission element, the takeoff-side damping device acts as a torsional vibration damper of the type called in professional circles a "turbine torsion damper" or "TTD", which, taken in itself, would result in the damping curve shown in FIG. 3, in which the elevation in rotational irregularity resulting from the third eigenfrequency EF3 is shifted to a range of around 1,000 rpm and therefore would cause very little trouble in the normal rpm range.

In contrast to the preceding discussion, the torsional vibration damper according to U.S. Pat. No. 7,073,646, called in professional circles a "two-damper converter" or TDC, is designed with a standard TD as a damping device on the drive side, which reduces the eigenfrequencies EF3 and EF4, and with a TTD as a damping device on the takeoff-side, which shifts the eigenfrequency EF3, which is the troublesome one, to a lower speed at which it generates little if any perceptible noise. The damping curve shown in FIG. 3 can thus be achieved with a TDC.

A damping curve of this type is desirable for modern vehicles, so that they can be operated with a completely engaged bridging clutch even in the lower partial load range relevant to fuel economy without thus making it necessary to accept disadvantages in the form of annoying vibrations or noise. To the extent that the bridging clutch is to be closed even at speeds as low as 1,000 rpm, however, even the damping curve provided by a TDC can still prove insufficient.

SUMMARY OF THE INVENTION

It is an object of the present invention to design a torsional vibration damper on a bridging clutch of a hydrodynamic clutch arrangement with at least two damping devices in such a way that undesirable vibrations or noises are no longer perceptible.

According to a preferred embodiment of the invention, a torsional vibration damper has at least two groups of energy-storage devices. A first energy-storage group, preferably the drive-side energy-storage group, has either at least two different energy-storage devices for generating a characteristic curve with at least two sections or at least one energy-storage device which generates a characteristic curve with only one section. A second energy-storage group of the torsional vibration damper, preferably the takeoff-side energy-storage group may have at least two different energy-storage devices to generate a characteristic curve with at least two sections, or it has exclusively identical energy-storage devices to generate a characteristic curve with only one section.

In a preferred design of the torsional vibration damper it is ensured that a predetermined stiffness ratio is obtained between the first energy-storage devices of the two energy-storage groups. By configuring the first sections of the characteristic curves of the two energy-storage groups in such a way that they end at different torque values, the transition between the softer first energy-storage devices of the two characteristic curves to the harder second energy-storage devices of the two characteristic curves occurs without an inflection point or an area with a clearly perceptible discontinuity in the characteristic curve which represents the sum of the two original characteristic curves and which is therefore called the "summation characteristic curve". This effect is especially advantageous when the torque present at the torsional vibration damper is of an order of magnitude which coincides with the end of at least one of the first sections of the characteristic curve and with the beginning of at least one of the second sections of the characteristic curve and when it changes over to the other section of this characteristic curve as the result of a small change in torque. The section of the characteristic curve active at the moment would change quite frequently in this way when a torsional vibration of alternating sign is superimposed on a torque of this order of magnitude. Through appropriate configuration of the characteristic curves, it is possible, either in addition or as an alternative, to ensure that the inflection point in question between the two sections of the characteristic curve is present in a partial load range relevant to fuel economy, this range usually being present when the throttle valve is at an opening angle in the range of 25-50%. With this type of design, the previously mentioned torsional vibrations cannot cause a change from one section of the characteristic curve to another.

In correspondence with another preferred design of the torsional vibration damper, it is possible to ensure that a predetermined stiffness ratio is obtained between exclusively identical energy-storage devices of preferably the first energy-storage group and the first energy-storage devices of preferably the second energy-storage group. It is advantageous for the first energy-storage group to be designed for a comparatively low stop torque, where this stop torque corresponds to only a fraction of the torque which can be supplied by a drive such as the crankshaft of an internal combustion engine. This means that, when the torque to be transmitted from the drive does not exceed this stop torque, both the first energy-storage group and the second energy-storage group are active, whereas, when the torque to be transmitted is above this value, only the second energy-storage group is active. The advantage of a design such as this is that the stiffness of the first energy-storage group can be made very low, because it does not have to absorb all of the torque which the drive can deliver. For this reason, the first energy-storage group is preferably located radially outside the takeoff-side energy-storage group, and in this way its springs acquire a longer travel distance.

In this design of the torsional vibration damper, the summation characteristic curve, formed out of a single first characteristic curve, i.e., a characteristic curve with only one section, and a second characteristic curve consisting of two different sections, again has essentially no inflection point or area of clearly perceptible discontinuity.

In still another preferred design of the torsional vibration damper, it can be ensured that a predetermined stiffness ratio is obtained between exclusively identical energy-storage devices of the first energy-storage group and exclusively identical energy-storage devices of the second energy-storage group. One of the energy-storage groups is preferably designed in such a way that its characteristic curve ends at a predetermined first torque value, whereas the characteristic curve of the other energy-storage group ends at a second torque value, wherein the second torque value should be of the order of magnitude of the maximum possible torque which can be transmitted by the drive, such as the crankshaft of an internal combustion engine, and should also be exceeded only slightly by the first torque value. When torque is to be transmitted from the drive in a design of this type, the lower torque value will not be exceeded and thus both energy-storage groups will remain effective as along as the torque to be transmitted from the drive remains just below the maximum possible torque, which means that both groups will remain effective during almost all phases of operation. It is advantageous for the higher torque value to be in the range of 110-120% of the torque which can be delivered by the drive, whereas the lower torque value should be in the range of 80-100% of this torque. The lower torque value is therefore preferably 10-40% less than the higher torque value.

Selecting the corresponding torque values in this way can also be advantageous for the designs of torsional vibration dampers previously described. The higher torque value in the case of the latter designs is assigned to the second section of the second characteristic curve of the energy-storage group with the higher stiffness, whereas the lower torque value is assigned either to the second section of the first characteristic curve or to the single section of the first characteristiccurve of the energy-storage group with the lower stiffness.

It may be advantageous in some designs of the torsional vibration damper for the lower torque value to be assigned to the first energy-storage group and for the higher torque value to be assigned to the second energy-storage group. In another case, however, the higher torque value can be assigned to the first energy-storage group, and the lower torque value can be assigned to the second energy-storage group. Nevertheless, in all of the previously mentioned designs of the torsional vibration damper, it is also possible and can be advantageous for the two energy-storage groups to be laid out in the opposite way with respect to each other.

The lower torque value in each case is preferably therefore 10-40% less than the associated higher torque value. As a result, the associated summation characteristic curve at least essentially has no inflection point or area with a clearly perceptible discontinuity within most of the range of the introduced torque, that is, within a range of approximately 80-100%. This is especially true for the design of the torsional vibration damper in which both of the energy-storage groups are each equipped exclusively with identical energy-storage devices and thus each have a characteristic curve with a single section.

By designing the openings in the intermediate transmission element and in the takeoff-side transmission element of the takeoff-side damping device, i.e., the openings which hold the energy-storage devices with different stiffnesses, so that they are at different angular distances from each other to produce webs of different widths between adjacent openings, it is ensured that the material loads on the webs is made more uniform, especially in the area where the end of the energy-storage device in question is supported, i.e., the area next to the opening located upstream in the direction of torque transmission, which is especially important in the case of the takeoff-side transmission element. As a result of this measure, the webs which serve to hold the energy-storage devices of lower stiffness assigned to the first section of the characteristic curve are made narrower by decreasing the angular distance between the openings, thus bringing the openings closer together, whereas the other webs, which serve to hold the energy-storage devices of higher stiffness assigned to the second section of the characteristic curve are made wider by increasing the angular distance between the openings, thus moving the openings farther apart. The webs are laid out in this way for the working direction of the energy-storage devices present during operation in pull mode, because only under these conditions can the applied torque reach the maximum value in question.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of exemplary embodiments.

DETAILED DESCRIPTION OF THE PRESENTLY PREFERRED EMBODIMENTS

Figure 1:
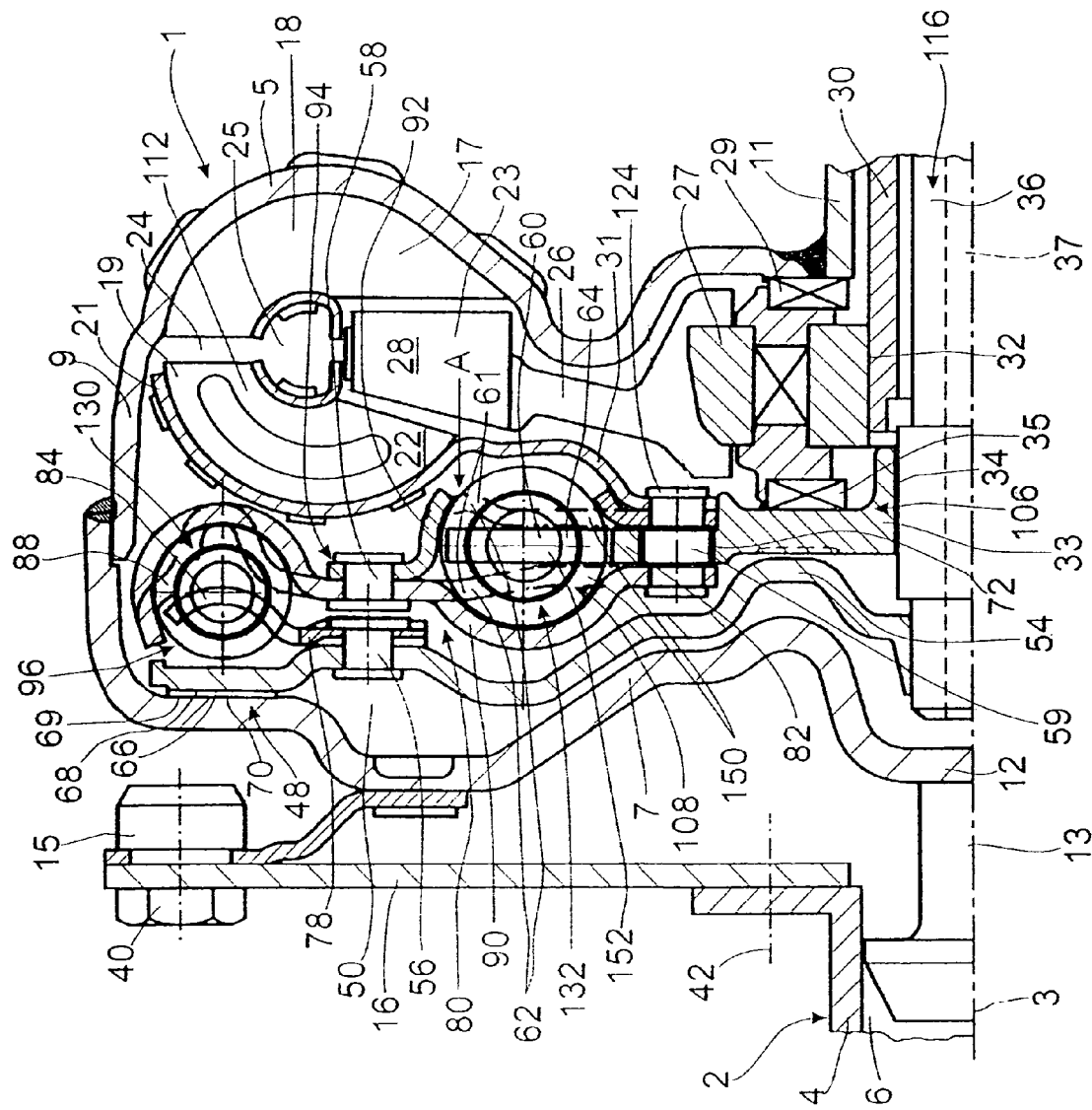
FIG. 1 is a longitudinal cross sectional view through an upper half of a hydrodynamic clutch arrangement with a bridging clutch and a torsional vibration damper, the damper being equipped with groups of two energy-storage devices.
Figure 2:
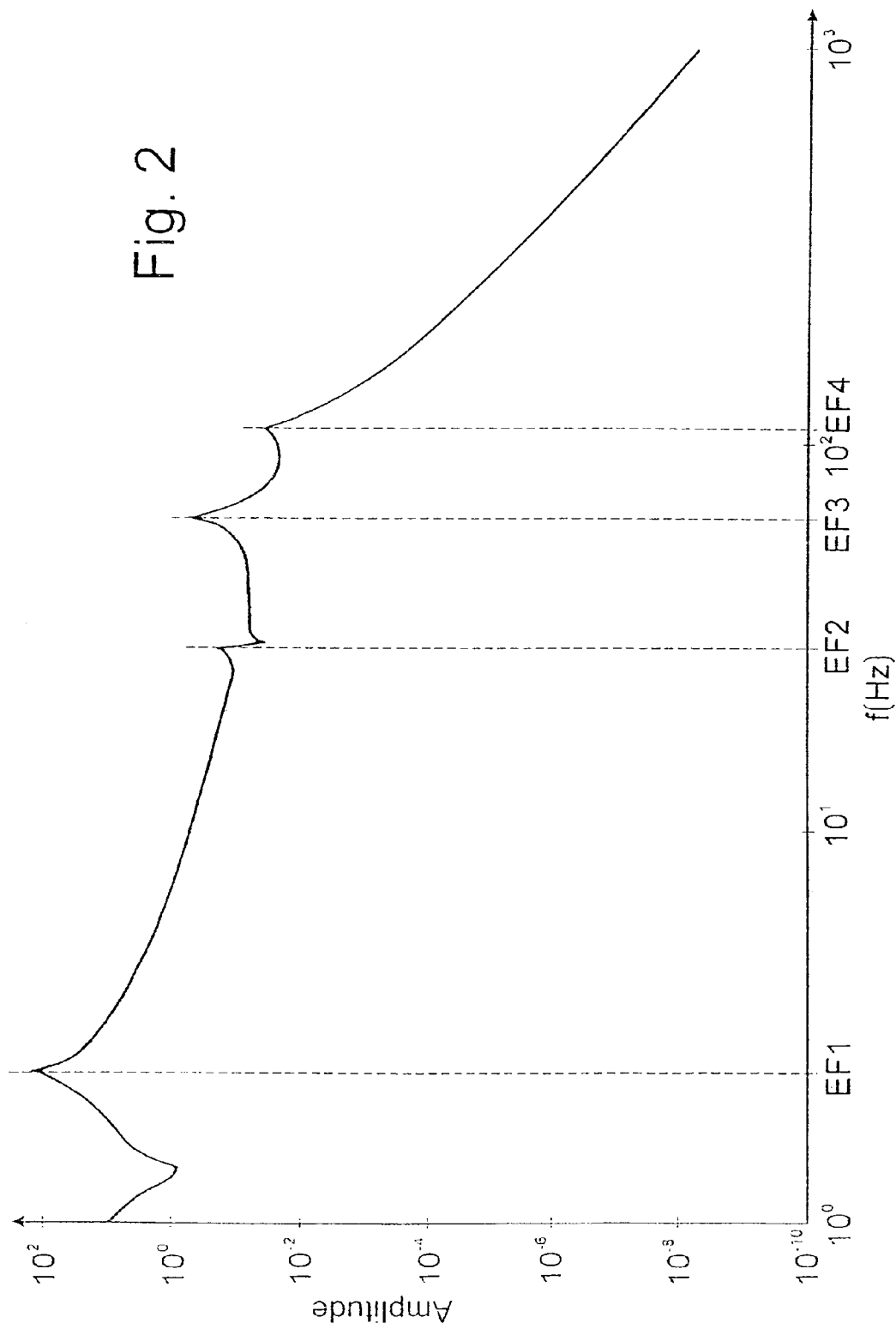
FIG. 2 is a logarithmic plot of the amplitude-frequency curve at the turbine wheel of a hydrodynamic clutch arrangement.

FIG. 1 shows a hydrodynamic clutch arrangement 1 in the form of a hydrodynamic torque converter, which is able to rotate around an axis of rotation 3. The hydrodynamic clutch arrangement 1 has a clutch housing 5, which, on the side facing a drive 2, such as the crankshaft 4 of an internal combustion engine, has a housing cover 7, which is permanently connected to a pump wheel shell 9. This shell 9 merges in its inner radial area with a pump wheel hub 11.

The housing cover 7 has in the radially inner area a journal hub 12 carrying a bearing journal 13. In a manner known, the bearing journal 13 is mounted in a recess 6 in the crankshaft 4 to center the clutch housing 5 on the drive side. The housing cover 7 also has a mounting receptacle 15, which is used to attach the clutch housing 5 to the drive 2, namely, by way of the flexplate 16. This flexplate 16 is attached to the mounting receptacle 15 by means of fastening elements 40 and to the crankshaft 4 by means of fastening elements 42, which are indicated only schematically.

The pump wheel shell 9 cooperates with the pump wheel vanes 18 to form a pump wheel 17, which works together with a turbine wheel 19, consisting of a turbine wheel shell 21 and turbine wheel vanes 22, and with a stator 23, equipped with stator vanes 28. The pump wheel 17, the turbine wheel 19, and the stator 23 form a hydrodynamic circuit 24, which encloses an internal torus 25, in the known manner.

The stator vanes 28 of the stator 23 are mounted on a stator hub 26, which is mounted on a freewheel 27. The latter is supported axially by way of an axial bearing 29 on the pump wheel hub 11 and is connected nonrotatably but with freedom of relative axial movement by means of a set of teeth 32 to a support shaft 30, which is located radially inside the pump wheel hub 11. The support shaft 30, which is designed as a hollow shaft, for its own part encloses a gearbox input shaft 36, which serves as a takeoff-side component 116 of the hydrodynamic clutch device 1 and which is provided with a central bore 37 for the passage of hydraulic fluid. The gearbox input shaft 36 has a set of teeth 34 by which it holds a torsion damper hub 33 nonrotatably in place while still allowing it freedom of movement in the axial direction. This torsion damper hub 33 serves to hold a turbine wheel base 31 with freedom of relative rotation. The torsion damper hub 33 is supported on one side via an axial bearing 35 against the freewheel 27 and rests on the other side by way of a piston 54 of a bridging clutch 48 against the housing cover 7.

The central bore 37 of the gearbox input shaft 36 serves to supply the hydrodynamic circuit 24 with hydraulic fluid and to exert pressure on the bridging clutch 48, for which purpose it is necessary that it be connected to a control device and to a reservoir of hydraulic fluid. Neither the control device nor the hydraulic fluid reservoir is shown in the drawing but can, for example be seen in FIG. 1 of DE 44 23 640 A1 and are therefore to be considered included in the content of the present patent application.

Hydraulic fluid which has flowed in through the central bore 37 of the gearbox input shaft 36 arrives in a chamber 50, which is located axially between the housing cover 7 and the piston 54 of the bridging clutch 48. The side of the piston 54 which faces away from the chamber 50 faces the hydrodynamic circuit 24 and is able to move axially between two different limit positions to engage or to disengage the bridging clutch 48 as a function of the pressure relationships in the hydrodynamic circuit 24 and in the chamber 50.

In its radially outer area, on the side facing the housing cover 7, the piston 54 carries on a friction lining carrier 66 a friction lining 68. This friction lining provides a friction area 69, which cooperates with an opposing friction area 70 on the housing cover 7. At a point radially inside the friction lining 68, a drive-side transmission element 78 of a torsional vibration damper 80 is attached to the piston 54 by means of rivets 56.

The drive-side transmission element 78 has an area, extending essentially in the radial direction, which has radially outward-pointing driver elements 84, which can be moved into working connection with a first group of energy-storage devices 130, referred to in the following as the drive-side energy-storage group 130. The drive-side energy-storage group 130 extends essentially in the circumferential direction and is supported at the other end against the driver elements 88 of a drive-side cover plate 90, which covers part of the circumference of the drive-side energy-storage group 130. The drive-side cover plate 90 is connected nonrotatably to a takeoff-side cover plate 92 by means of rivets 58 and mortise joints 59 and is also connected nonrotatably by mortise joints 59 to the turbine wheel base 31. The cover plates 90, 92 serve jointly as the intermediate transmission element 94 of the torsional vibration damper 80. The mortise joints 59 serve an additional function, namely, as a component of a rotational angle limiter 124 between the cover plates 90, 92 and a hub disk 82 connected nonrotatably to the torsion damper hub 33, in that the mortise joints 59 engage in circumferential openings 72, which are provided in the hub disk 82 and extend in the form of slots in the circumferential direction. The circumferential openings 72 thus allow relative movement of the mortise joints 59 in the circumferential direction but only within certain circumferential limits. The hub disk 82 and the torsion damper hub 33 together form the takeoff-side transmission element 106 of the torsional vibration damper 80.

The cover plates 90, 92 acting as the intermediate transmission element 94, are provided with openings 150 in the form of spring windows 62, radially between the rivets 58 and the mortise joints 59, to accommodate a second group of energy-storage devices, which is referred to below as the takeoff-side energy-storage group 132, whereas the hub disk 82 provided as the takeoff-side transmission element 106 of the takeoff-side damping device 108 is designed with driver elements 60 for this energy-storage group 132. Circumferentially between these driver elements 60, openings 152 in the form of spring windows 64 are provided for the takeoff-side energy-storage group 132.

Figure 7:
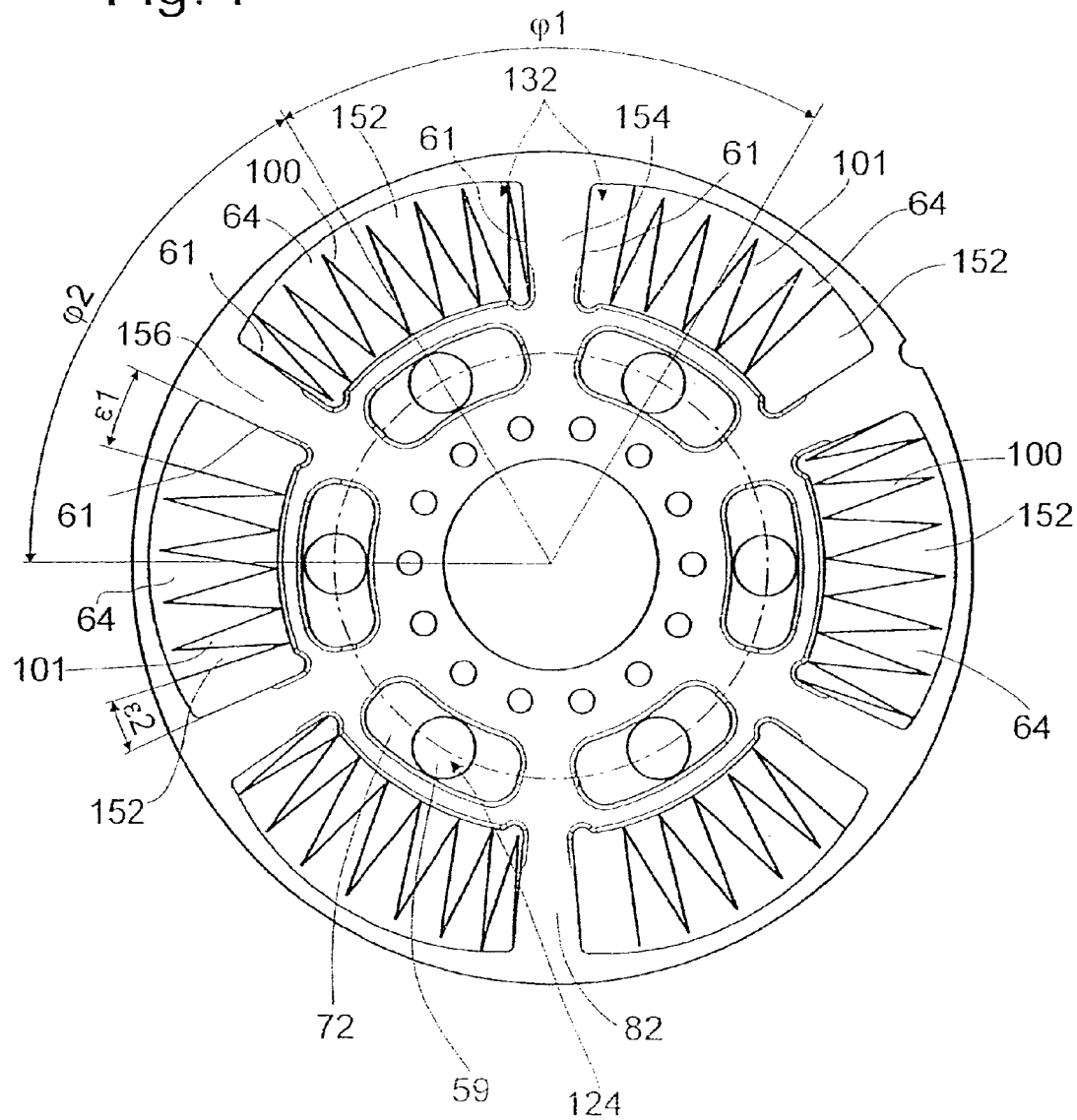
FIG. 7 is a cross sectional view of a hub disk of the takeoff-side energy-storage group, seen in direction A of FIG. 1.

The openings 150 in the intermediate transmission element 94 accommodate the energy-storage devices 100, 101 (FIG. 7) of the takeoff-side energy-storage group 132 in such a way that both ends of the devices 100, 101 rest against the circumferential ends of the openings 150. The openings 152 in the hub disk 82 provided for the first energy-storage devices 100 of the takeoff-side energy-storage group 132 also hold these first energy-storage devices 100 at both circumferential ends, so that the energy-storage devices 100 can go into action right from the beginning of the torque transmission process. In contrast, the openings 152 in the hub disk 82 provided for the second energy-storage devices 101 of the takeoff-side energy-storage group 132 are larger in the circumferential direction than these energy-storage devices 101, in order, as shown in FIG. 7, to make possible a free effective angle of rotation γ1 during operation in pull mode and a free effective angle of rotation ε2 during operation in push mode before the second energy-storage devices 101 go individually into action.

The spring windows 64 of the hub disk 82 form the circumferential boundaries of webs 154, 156 (FIG. 7), which act functionally as driver elements 61 for the energy-storage devices 100, 101 of the takeoff-side energy-storage group 132. The first energy-storage devices 100 of this energy-storage group 132 can be less stiff than the second energy-storage devices 101. As a result of this, the tension which the second energy-storage devices 101 exert on the second webs 156 assigned to them can be higher than that exerted by the first energy-storage devices 100 against their webs 154. This problem becomes evident in particular during operation in pull mode under full load, for which reason the webs 154, 156 which are adjacent to each other in the pulling direction are designed differently in correlation with their associated energy-storage devices 100, 101. The spring windows 64 assigned in the pulling direction to the first energy-storage devices 100 are thus brought closer to each other by a predetermined angle, preferably by approximately 1°, whereas the spring windows 64 which work together in the pulling direction with at least one of the second energy-storage devices 101 are moved farther apart from each other, also by a predetermined angle, preferably by approximately 1°. When the spring windows 64 are brought approximately 1° closer, a smaller angular distance φ1 (FIG. 7) is created, which, when six spring windows are present, assumes a value of 59° and leads to the formation of narrower webs 154, whereas, when the spring windows 64 are moved approximately 1° farther apart, an increased angular distance φ2 is created, which, when six spring windows are present, assumes a value of 61° and leads to the formation of wider webs 156. Because of their different widths, the webs 154, 156 are better adapted in terms of their strength to the different loads caused by the different stiffnesses of the energy-storage devices 100, 101, which means that the circumferential dimensions of the webs 154, 156 are optimized in each case with respect to the absorption of load.

Figure 8:
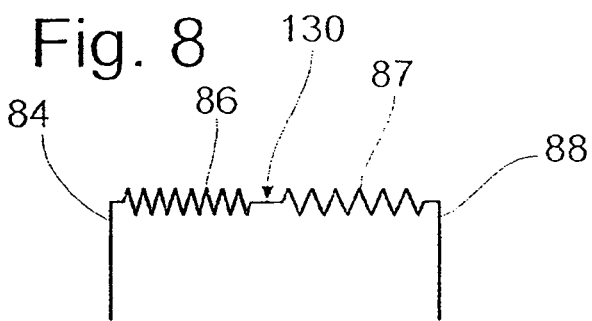
FIG. 8 is a schematic diagram of the drive-side energy-storage group with two energy-storage devices of different stiffnesses connected in series.
Figures 9, 10:
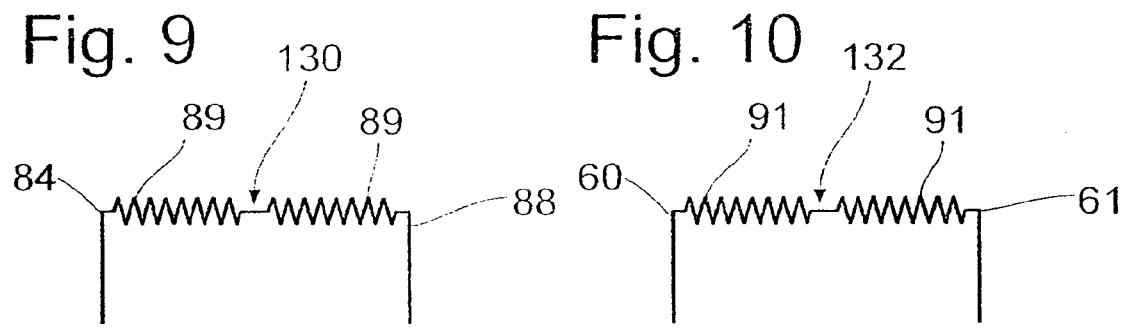
FIG. 9 is similar to FIG. 8 but shows exclusively identical energy-storage devices.
FIG. 10 is similar to FIG. 9 but shows the takeoff-side energy-storage group.

In remains to be noted concerning the drive-side energy-storage group 130 that this group has either energy-storage devices 86, 87 of different stiffnesses according to FIG. 8, where the stiffness of the first energy-storage device 86 is less than that of the second energy-storage device 87, or exclusively identical energy-storage devices 89 according to FIG. 9, the stiffnesses of which are therefore all the same. If the energy-storage devices 100, 101 of different stiffnesses shown in FIG. 7 are not provided for the takeoff-side energy-storage group 132, this energy-storage group 132 will have the exclusively identical energy-storage devices 91 according to FIG. 10.

A drive-side damping device 96 of the torsional vibration damper 80 is to be formed out of the drive-side transmission element 78 in conjunction with the drive-side energy-storage group 130 and the intermediate transmission element 94, whereas a takeoff-side damping device 108 is to be formed out of the intermediate transmission element 94 in conjunction with the takeoff-side energy-storage group 132 and the takeoff-side transmission element 106. The turbine wheel 19, which is connected to the intermediate transmission element 94 effectively between the two damping devices 96, 108, serves as a mass element 112 for the torsional vibration damper 80.

Figure 3:
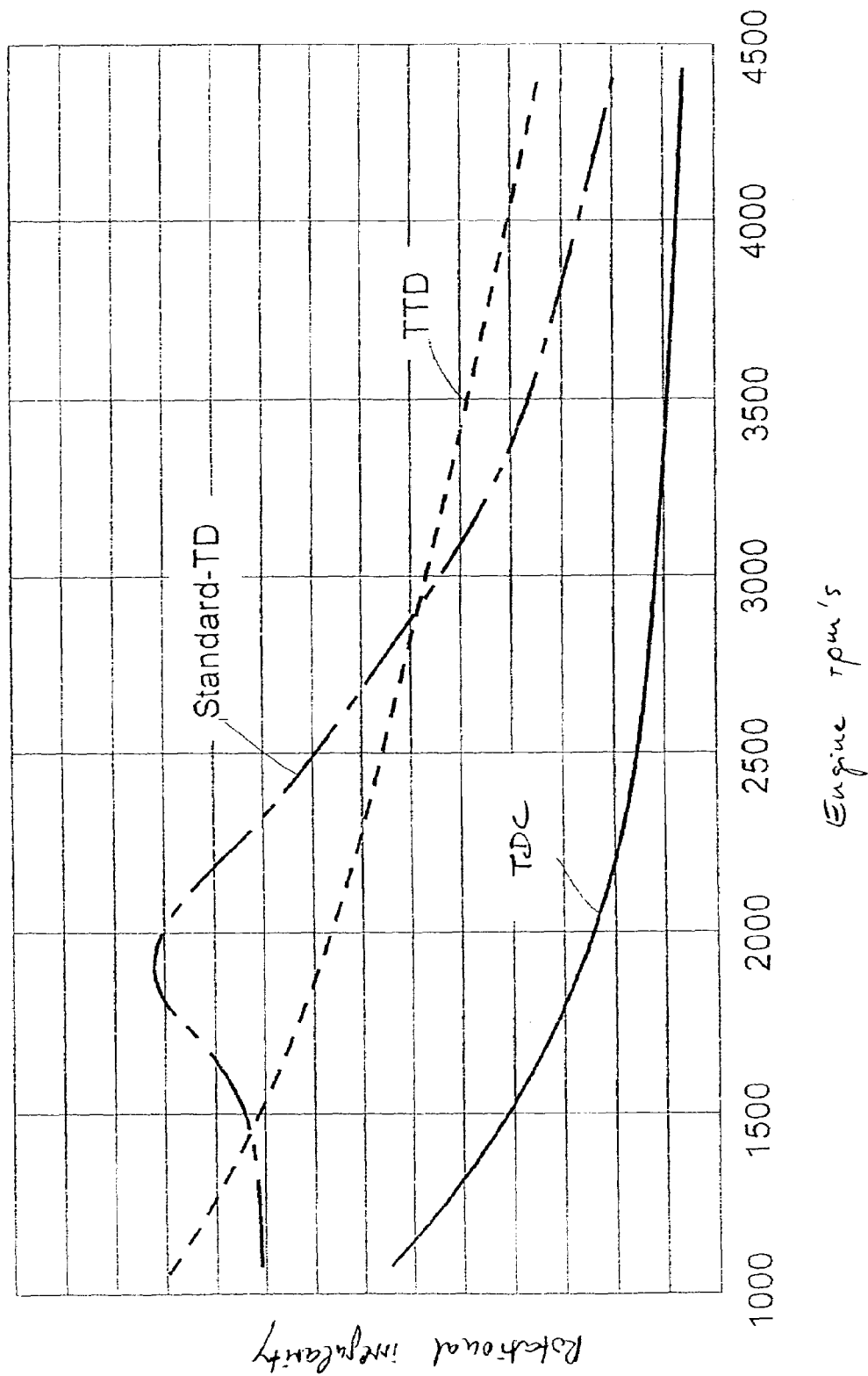
FIG. 3 is a schematic diagram of the rotational irregularity curves of different torsional vibration dampers.

Because the intermediate transmission element 94 acts as a takeoff-side component for the drive-side damping device 96, and because this component is solidly connected to the turbine wheel 19 by means of mortise joints 59, the drive-side damping device 96 acts as a standard torsion damper, called a "standard TD" in professional circles (see FIG. 3). In contrast, the intermediate transmission element 94 in the case of the takeoff-side damping device 108 serves as a drive-side component, whereas the takeoff-side transmission element 106 of this damping device 108 is free to rotate relative to the turbine wheel 19, even though it is connected nonrotatably to the torsional vibration damper hub 33. To this extent the takeoff-side damping device 108 acts as a turbine torsion damper (TTD) (FIG. 3).

Thus, in the case of the torsional vibration damper 80 shown in FIG. 1, a standard torsion damper and a turbine torsion damper are connected in series to form a single structural unit and can therefore supplement each other's specific actions. What we have therefore is a TDC according to FIG. 3.

Figure 4:
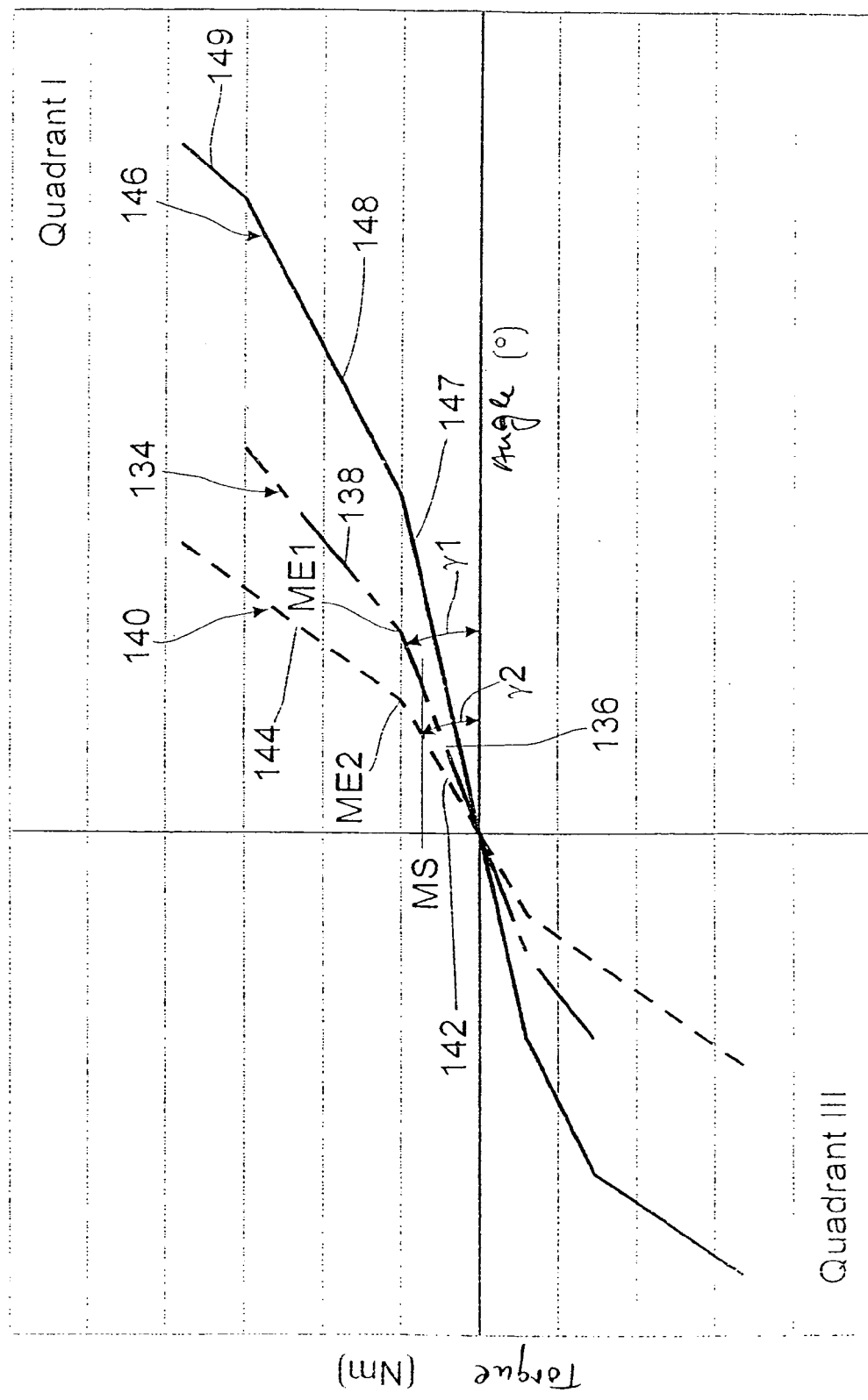
FIG. 4 is a diagram of the characteristic curves of a torsional vibration damper, including the summation characteristic curve obtained as the sum of two sub-characteristic curves, each of which has two different sections.
Figure 5:
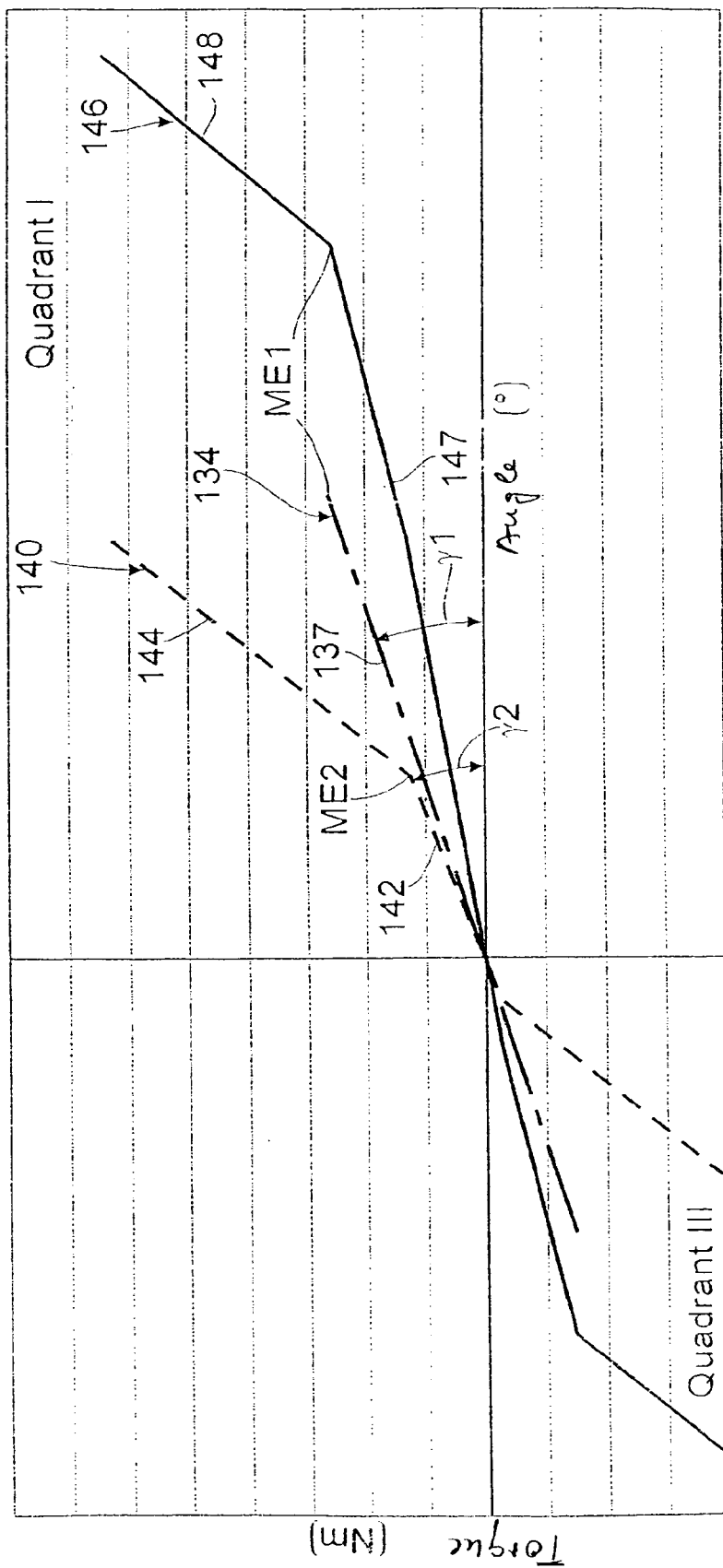
FIG. 5 is similar to FIG. 4 in that it shows a summation characteristic curve, but here the summation characteristic curve is obtained as the sum of a first characteristic curve with a single section and a second characteristic curve with two different sections.
Figure 6:
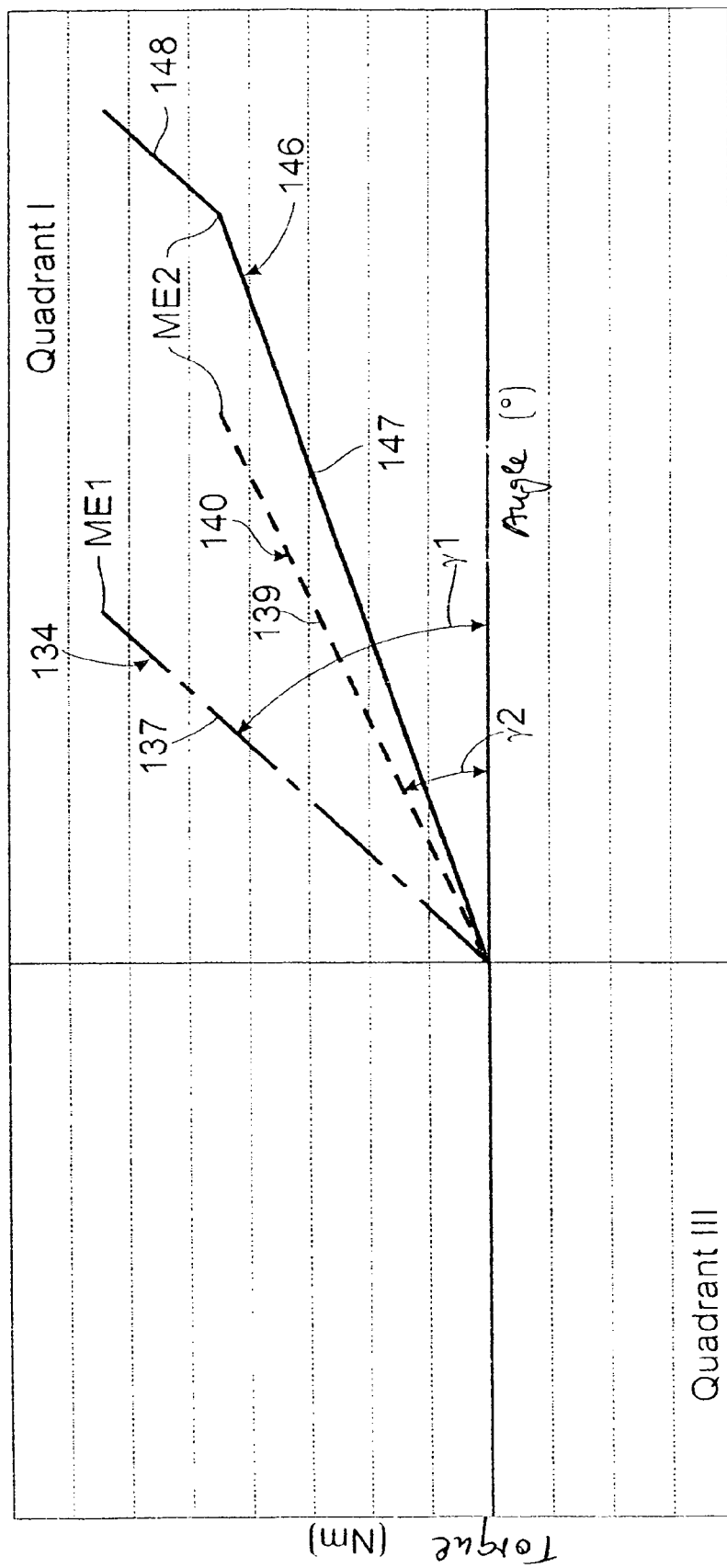
FIG. 6 is similar to FIG. 4 in that it shows a summation characteristic curve, but here the summation characteristic curve is obtained as the sum of two sub-characteristic curves, each of which has only a single section.

FIGS. 4-6 are diagrams in which, to illustrate the characteristic curves of the energy-storage groups 130, 132, the torque acting at the moment in question is plotted versus the associated deflection angle of the energy-storage devices of the energy-storage groups. That is, operation in pull mode is shown in Quadrant I, operation in push mode in Quadrant III. In all three diagrams, a first characteristic curve 134 assigned to the drive-side energy-storage group 130 is shown in dash-dot line; a second characteristic curve 140 assigned to the takeoff-side energy-storage group 132 is shown in dashed line; and a summation characteristic curve 146 formed by the superimposition of the two characteristic curves 134, 140 is shown in solid line.

In regard to the situation in pull mode, FIG. 4 shows the first characteristic curve 134 assigned to the drive-side energy-storage group 130 with a first section 136 having a first characteristic and with an adjacent second section 138 having a second characteristic, wherein the first section 136 is assigned to the first energy-storage devices 86 and the second section 138 to the second energy-storage devices 87 of the drive-side energy-storage group 130. In the same way, the second characteristic curve 140 assigned to the takeoff-side energy-storage group 132 is provided with a first section 142 having a first characteristic and an adjacent second section 144 having a second characteristic, wherein the first section 142 of the characteristic curve is assigned to the first energy storage devices 100 and the second section 144 to the second energy-storage devices 101 of the takeoff-side energy-storage group 132.

As can be seen from the flatter slope γ1 of the first section 136 of the first characteristic curve 134 in comparison to the slope γ2 of the first section 142 of the second characteristic curve 140, the first energy-storage devices 86 of the drive-side energy-storage group 130 are less stiff than the first energy-storage devices 100 of the takeoff-side energy-storage group 132. With respect to the stiffness ratio between the first energy-storage devices 86 of the drive-side energy-storage group 130 and the first energy-storage devices 100 of the takeoff-side energy-storage group 132, it has been discovered that an especially advantageous damping behavior for the torsional vibration damper 80 is obtained at a stiffness ratio in the range of 0.3-1.0.

Figure 11:
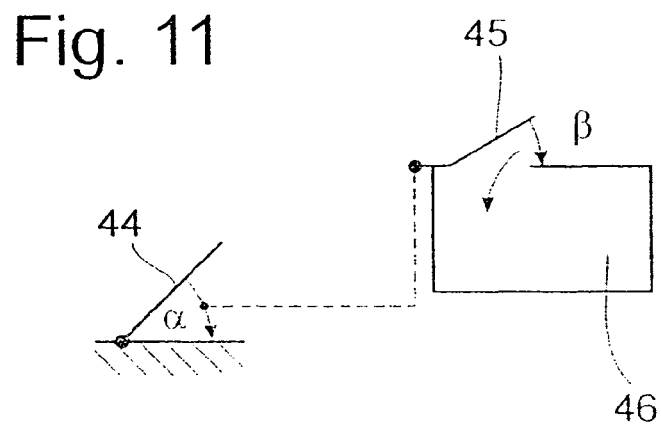
FIG. 11 is a schematic diagram of a throttle valve for influencing the behavior of a drive installed in front of the hydrodynamic clutch device.

Because the transitions of the two first sections 136 and 142 to the second sections 138, 144 each take place in the same order of magnitude of the torque, i.e., the torque values ME1 and ME2 at the end points of the first sections 136 and 142 are equal, the resulting summation characteristic curve 146 also shows a transition at this same torque, namely, the transition from the first section 147 of the summation characteristic curve to the second section 148 of the summation characteristic curve. This is followed in turn by a third section 149 of the summation characteristic curve, which results from the fact that the second section 144 of the second characteristic curve 140 extends to a higher torque than the second section 138 of the first characteristic curve 134. The three sections 147, 148, 149 of the summation characteristic curve can merge with each other by way of slight discontinuities. Discontinuities of this type can be perceived as a shift in the eigenfrequency of the torsional vibration damper 80 to a higher rpm level. This situation can be remedied, however, by adjusting torque values ME1 and ME2 of the respective ends of the associated first sections 136, 142 of the two characteristic curves 134, 140 by a predetermined amount to a value approximately 10-30% above a static torque MS, so that, even if very strong torsional vibrations should be superimposed on the static torque MS, they will not cause the torque to reach the values ME1 and ME2. There will therefore not be a change between section 136 and section 138 or a change between section 142 and section 144. The risk of an operating state such as this is greatest when the bridging clutch 48 has already been engaged in the partial load range relevant to fuel economy at low rpm's, that is, at approximately 1,000 rpm, and a gas pedal 44, shown in FIG. 11, assigned to the drive 2, is actuated around an angle α where a downline throttle valve 45 of a mixture preparation area 46 is opened to an angle β. In this energy-conserving mode, the angle β can be in a range of approximately 30-80% of the deflection distance of the throttle valve 45.

In this design of the energy-storage groups 130, 132 of the torsional vibration damper 80, the first energy-storage devices 86, 100 of the two energy-storage groups 130, 132 therefore go into action successively, before the second energy-storage devices 88, 101 of the two energy-storage groups 130, 132 are activated in succession.

FIG. 5, which reflects the situation in pull mode, shows the first characteristic curve 134 assigned to the drive-side energy-storage group 130 with a single section 137, which is assigned to the exclusively identical energy-storage devices 89 and shows a steady characteristic. In contrast, the second characteristic curve 140 assigned to the takeoff-side energy-storage group 132 is provided with a first section 142 having a first characteristic and with an adjacent second section 144 having a second characteristic, wherein the first section 142 of the characteristic curve 140 is assigned to the first energy-storage devices 100 and the second section 144 of the characteristic curve 140 to the second energy-storage devices 101 of the takeoff-side energy-storage group 132.

As can be seen from the flatter slope γ1 of the section 137 of the first characteristic curve 134 in comparison to the slope γ2 of the first section 142 of the second characteristic curve 140, the energy-storage devices 89 of the drive-side energy-storage group 130 are less stiff than the first energy-storage devices 100 of the takeoff-side energy-storage group 132. With respect to the stiffness ratio of the energy-storage devices 89 of the drive-side energy-storage group 130 to the first energy-storage devices 100 of the takeoff-side energy-storage group 132, it has been discovered that an especially advantageous damping behavior for the torsional vibration damper 80 is obtained at a stiffness ratio in the range of 0.3-1.0.

Because the torque value ME1 at which the section 137 of the first characteristic curve 134 ends is different from the torque value ME2 at which the first section 142 of the second characteristic curve 140 passes over to the second section 144, the resulting summation characteristic curve 146 has an at least essentially transition-free section 147 at the angle assigned to the torque value ME2. Only when the section 137 of the first characteristic curve 134 reaches the torque value ME1 does there arise a discontinuity, namely, at the transition from the first section 147 of the summation characteristic curve 146 to a second section 148 of the summation characteristic curve 146. This discontinuity, however, occurs only at a relatively high torque ME1 and is therefore outside the partial load range relevant to fuel economy. This discontinuity, at which the deformation path of the energy-storage devices 89 assigned to the section 137 of the first characteristic curve 134 is at least essentially used up, is to this extent uncritical.

In this design of the energy-storage groups 130, 132 of the torsional vibration damper 80, both of the energy-storage devices 100, 101 of the takeoff-side energy-storage group 132 are active at first, but later only the second energy-storage devices 101 of the takeoff-side energy-storage group 130 undergo deformation.

FIG. 6 shows the situation in pull mode, in which the first characteristic curve 134 assigned to the drive-side energy-storage group 130 is provided with a single section 137, which is assigned to the exclusively identical energy-storage devices 89. In a similar manner, the second characteristic curve 140 assigned to the takeoff-side energy-storage group 132 is provided with a single section 139, which is assigned to the exclusively identical energy-storage devices 91.

In this design of the torsional vibration damper 2, as can be seen from the steeper slope γ1 of the section 137 of the first characteristic curve 134 in comparison with the slope γ2 of the section 139 of the second characteristic curve 140, the energy-storage devices 89 of the drive-side energy-storage group 130 are stiffer than the energy-storage devices 91 of the takeoff-side energy-storage group 132. Other designs are also conceivable, however, in which the stiffness of the energy-storage devices 89 of the drive-side energy-storage group 130 is less than the stiffness of the energy-storage devices 91 of the takeoff-side energy-storage group 132. With respect to the stiffness ratio between the energy-storage devices 89 of the drive-side energy-storage group 130 and the energy-storage devices 91 of the takeoff-side energy-storage group 132, it has been discovered that especially advantageous damping behavior for the torsional vibration damper 80 is obtained at a ratio in the range of 0.7-1.2.

Because the transition of the second characteristic curve 140 to the first characteristic curve 134 occurs at a torque value ME2 which is just below the maximum possible amount of torque which can be delivered by the drive 2 or which is at least essentially equal to that torque, whereas the torque value ME1 of the first characteristic curve 134 is just above the maximum amount of torque which can be delivered by the drive 2, the resulting summation characteristic curve 146 remains free of transitions until it reaches the relatively high torque value ME2, and only after that does a transition occur from a first section 147 of the summation characteristic curve to a second section 148 of the summation characteristic curve. The torque values are preferably selected here in such a way that the lower torque value ME2 is at least essentially 80-100% of the maximum possible torque to be transmitted by the drive 2, whereas the higher torque value ME1 is at least essentially 110-120% of the previously mentioned torque to be transmitted. The torque value ME1 can thus be set at a value which is approximately 10-40% greater than the torque value ME2.

In this design of the energy-storage groups 130, 132 of the torsional vibration damper 80, the energy-storage devices 89, 91 of the two energy-storage groups 130, 132 are acting simultaneously until the torque value ME2 is reached, after which point the energy-storage devices 89 of the first energy-storage group 130, 32 act alone.

Although the previously explained inventive designs of the energy-storage groups 130, 132 have been explained on the basis of a TDC torsional vibration damper, it is also conceivable that these designs of the energy-storage groups 130, 132 could also be implemented in functionally different torsional vibration dampers, such as in, for example, pure standard torsion dampers or pure turbine torsion dampers. The prerequisite for such implementation, however, is that the individual torsional vibration damper in question must have two energy-storage groups connected in series.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for a bridging clutch of a hydrodynamic clutch arrangement, comprising:

a drive-side damping device having a drive-side transmission element connectable to the bridging clutch, an intermediate transmission element, and a drive-side group of energy-storage devices arranged circumferentially between the drive-side transmission element and the intermediate transmission element so that the drive-side transmission element and the intermediate transmission element are rotatable relative to each other against an urgency of the drive-side group of energy-storage devices; and a takeoff-side damping device having a take off-side transmission element connected to a takeoff-side component of the clutch arrangement, the intermediate transmission element, and a takeoff-side group of energy-storage devices arranged circumferentially between the intermediate element and the takeoff-side transmission element so that the intermediate transmission element and the take off-side transmission element are rotatable relative to each other against an urgency of the takeoff-side group of energy-storage devices; and a hydrodynamic clutch device, which has at least one pump wheel and a turbine wheel to form a hydrodynamic circuit, the intermediate transmission element being connected nonrotatably to the turbine wheel and the takeoff-side transmission element being connected nonrotatably to the takeoff-side component;

wherein the drive-side group of energy-storage devices has first and second energy-storage devices exhibiting a characteristic deflection curve with at least first and second sections having different deflection characteristics, and wherein the takeoff-side group of energy-storage devices has at least first and second energy-storage devices exhibiting a characteristic deflection curve with first and second sections; and wherein the stiffness of the first energy-storage devices of the drive-side group of energy-storage devices is lower than the stiffness of the first energy-storage devices of the takeoff-side group of energy-storage devices so that a predetermined stiffness ratio of the stiffness of the first energy-storage devices of the drive-side group of energy-storage devices to the stiffness of the first energy-storage devices of the takeoff-side group of energy-storage devices is established; and wherein the second section of the characteristic deflection curve of the drive-side group of energy-storage devices ends at least essentially at a torque value which is in the range of 80-100% of a torque generated by a drive of the clutch arrangement, and wherein the second section of the characteristic deflection curve of the takeoff-side group of energy-storage devices ends at a torque value which is in the range of 110-120% of the torque generated by the drive.

2. The torsional vibration damper of claim 1, wherein the first sections of the characteristic deflection curves of the drive-side group and the takeoff-side group of energy storage devices end essentially at a same torque value.

3. The torsional vibration damper of claim 1, wherein the predetermined stiffness ratio of the stiffness of the first energy-storage devices of the drive-side group of energy-storage devices to the stiffness of the first energy-storage devices of the takeoff-side group of energy-storage devices is in the range of 0.3-1.0.

4. The torsional vibration damper of claim 1, wherein the first sections of the characteristic deflection curves of the first energy-storage devices of both the drive-side group and the takeoff side group of energy-storage devices are adapted to a partial load range of a drive of the clutch arrangement, the partial load range being associated with a throttle valve of the drive positioned within a range of essentially 25-50% of the fully open angle of the throttle valve.

5. The torsional vibration damper of claim 1, wherein the first sections of the characteristic deflection curves of the first energy-storage devices of both the drive-side group and the takeoff-side group of energy-storage devices end at a torque value which is above, by a predetermined amount, a static torque delivered by a drive of the clutch arrangement at a predetermined position of a throttle valve of the drive.

6. The torsional vibration damper of claim 5, wherein the predetermined amount is 10-30%.

7. The torsional vibration damper of claim 1, wherein the energy-storage devices of the drive-side group of energy-storage devices are held and at least partially enclosed by the intermediate transmission element, and wherein the energy-storage devices of the takeoff-side group of energy-storage devices are held in openings in the intermediate transmission element and in openings in the takeoff-side transmission element.

8. The torsional vibration damper of claim 7, wherein the openings in the intermediate transmission element and the corresponding openings in the takeoff-side transmission element are designed with different angular distances between them thereby forming webs of different widths between associated openings.

9. The torsional vibration damper of claim 8, wherein, for the take off-side group of energy-storage devices, an angular distance between the openings which hold the first energy-storage devices is smaller than an angular distance between the openings which hold the second energy-storage devices such that webs between the openings which serve to hold the first energy-storage devices are smaller than the webs between the openings which serve to hold the second energy-storage devices.

10. The torsional vibration damper of claim 9, wherein the angular distance between the openings which hold the first energy-storage devices is at most 5° smaller than an angular distance between such openings in a design in which all the openings are separated by a same angle, and wherein the angular distance between the openings which hold the second energy-storage devices is at most 5° larger than an angular distance between such openings in the design in which all the openings are separated by the same angle.

11. The torsional vibration damper of claim 9, wherein the angular distance between the openings which hold the first energy-storage devices is at least 1° smaller than an angular distance between such openings in a design in which all the openings are separated by a same angle, and wherein the angular distance between the openings which hold the second energy-storage devices is at least 1° larger than an angular distance between such openings in the design in which all the openings are separated by the same angle.

12. A torsional vibration damper for a bridging clutch of a hydrodynamic clutch arrangement, comprising:

a drive-side damping device having a drive-side transmission element connectable to the bridging clutch, an intermediate transmission element, and a drive-side group of energy-storage devices arranged circumferentially between the drive-side transmission element and the intermediate transmission element so that the drive-side transmission element and the intermediate transmission element are rotatable relative to each other against an urgency of the drive-side group of energy-storage devices;

a takeoff side damping device having a take offside transmission element connected to a takeoff-side component of the clutch arrangement, the intermediate transmission element, and a takeoff side group of energy-storage devices arranged circumferentially between the intermediate element and the takeoff side transmission element so that the intermediate transmission element and the take offside transmission element are rotatable relative to each other against an urgency of the take off-side group of energy-storage devices; and a hydrodynamic clutch device, which has at least one pump wheel and a turbine wheel to form a hydrodynamic circuit, the intermediate transmission element being connected nonrotatably to the turbine wheel and the takeoff-side transmission element being connected nonrotatably to the takeoff side component;

wherein one of the drive-side group or the takeoff side group of energy-storage devices has at least first and second energy-storage devices exhibiting a characteristic deflection curve with at least first and second sections having different deflection characteristics, wherein the other one of the drive-side group or the takeoff-side group of energy-storage devices has first energy-storage devices, each of the first energy storage devices of the other one of the drive-side group or the takeoff-side group of energy storage devices exhibiting the same characteristic deflection curve with a single section;

wherein a predetermined stiffness ratio of the stiffness of the first energy-storage devices of the drive-side group of energy-storage devices to the stiffness of the first energy-storage devices of the takeoff-side group of energy-storage devices is in the range of 0.3-1.0.

13. The torsional vibration damper of claim 12, wherein the single section of the characteristic deflection curve of the first energy-storage devices of the other one of the drive-side group or the takeoff-side group of energy storage devices ends at a first torque value, and wherein the first section of the characteristic deflection curve of the one of the drive-side group or the takeoff-side group of energy-storage devices ends at a second torque value, the first and second torque values differing from each other.

14. A torsional vibration damper for a bridging clutch of a hydrodynamic clutch arrangement, comprising:

a drive-side damping device having a drive-side transmission element connectable to the bridging clutch, an intermediate transmission element, and a drive-side group of energy-storage devices arranged circumferentially between the drive-side transmission element and the intermediate transmission element so that the drive-side transmission element and the intermediate transmission element are rotatable relative to each other against an urgency of the drive-side group of energy-storage devices;

a takeoff side damping device having a take offside transmission element connected to a takeoff-side component of the clutch arrangement, the intermediate transmission element, and a takeoff side group of energy-storage devices arranged circumferentially between the intermediate element and the takeoff side transmission element so that the intermediate transmission element and the take offside transmission element are rotatable relative to each other against an urgency of the take off-side group of energy-storage devices; and a hydrodynamic clutch device, which has at least one pump wheel and a turbine wheel to form a hydrodynamic circuit, the intermediate transmission element being connected nonrotatably to the turbine wheel and the takeoff-side transmission element being connected nonrotatably to the takeoff side component;

wherein one of the drive-side group or the takeoff side group of energy-storage devices has at least first and second energy-storage devices exhibiting a characteristic deflection curve with at least first and second sections having different deflection characteristics, wherein the other one of the drive-side group or the takeoff-side group of energy-storage devices has first energy-storage devices, each of the first energy-storage devices exhibiting the same characteristic deflection curve with a single section;

wherein the stiffness of the first energy-storage devices of the drive-side group of energy-storage devices is lower than the stiffness of the first energy-storage devices of the takeoff side group of energy-storage devices so that a predetermined stiffness ratio of the stiffness of the first energy-storage devices of the drive-side group of energy-storage devices to the stiffness of the first energy-storage devices of the takeoff side group of energy-storage devices is established; and wherein the single section of the characteristic deflection curve of the other one of the drive-side group or the takeoff-side group of energy-storage devices ends at least essentially at a torque value which is in the range of 80-100% of a torque generated by a drive of the clutch arrangement, and wherein the second section of the characteristic deflection curve of the one of the drive-side group or the takeoff side group of energy-storage devices ends at a torque value which is in the range of 110-120% of the torque generated by the drive.

15. A torsional vibration damper for a bridging clutch of a hydrodynamic clutch arrangement, comprising:

a drive-side damping device having a drive-side transmission element connectable to the bridging clutch, an intermediate transmission element, and a drive-side group of energy-storage devices arranged circumferentially between the drive-side transmission element and the intermediate transmission element so that the drive-side transmission element and the intermediate transmission element are rotatable relative to each other against an urgency of the drive-side group of energy-storage devices; and a takeoff-side damping device having a take off-side transmission element connected to a takeoff-side component of the clutch arrangement, the intermediate transmission element, and a takeoff side group of energy-storage devices arranged circumferentially between the intermediate element and the takeoff-side transmission element so that the intermediate transmission element and the take off-side transmission element are rotatable relative to each other against an urgency of the takeoff-side group of energy-storage devices; and a hydrodynamic clutch device, which has at least one pump wheel and a turbine wheel to form a hydrodynamic circuit, the intermediate transmission element being connected nonrotatably to the turbine wheel and the takeoff-side transmission element being connected nonrotatably to the takeoff-side component;

wherein the drive-side group of energy-storage devices has first energy-storage devices exhibiting the same characteristic deflection curve with a single section;

wherein the takeoff-side group of energy-storage devices has first energy-storage devices exhibiting the same characteristic deflection curve with a single section; and wherein the stiffness of the first energy-storage devices of the drive-side group of energy-storage devices is different from the stiffness of the first energy-storage devices of the takeoff-side group of energy-storage devices so that a predetermined stiffness ratio of the stiffness of the first energy-storage devices of the drive-side group of energy-storage devices to the stiffness of the first energy-storage devices of the takeoff-side group of energy-storage devices is established; and wherein the single section of the characteristic deflection curve of one of the drive-side group or the takeoff-side group of energy-storage devices designed with lower stiffness ends at a first torque value which is in the range of 80-100% of a torque produced by a drive of the clutch arrangement, and wherein the single section of the characteristic deflection curve of the other one of the drive-side group or the takeoff-side group of energy-storage devices designed with higher stiffness ends at a torque value which is in the range of 110-120% of the torque produced by the drive.

16. The torsional vibration damper of claim 15, wherein the stiffness of the first energy-storage devices of the drive-side group of energy-storage devices is higher than the stiffness of the first energy-storage devices of the takeoff-side group of energy-storage devices.

17. The torsional vibration damper of claims 15, wherein the single section of the characteristic deflection curve of the drive-side group of energy-storage devices ends at a first torque value, and the single section of the characteristic deflection curve of the takeoff side group of energy-storage devices ends at a second torque value, the first and second torque values differing from each other.

18. A torsional vibration damper for a bridging clutch of a hydrodynamic clutch arrangement, comprising:

a drive-side damping device having a drive-side transmission element connectable to the bridging clutch, an intermediate transmission element, and a drive-side group of energy-storage devices arranged circumferentially between the drive-side transmission element and the intermediate transmission element so that the drive-side transmission element and the intermediate transmission element are rotatable relative to each other against an urgency of the drive-side group of energy-storage devices; and a takeoff side damping device having a take offside transmission element connected to a takeoff-side component of the clutch arrangement, the intermediate transmission element, and a takeoff side group of energy-storage devices arranged circumferentially between the intermediate element and the takeoff side transmission element so that the intermediate transmission element and the take offside transmission element are rotatable relative to each other against an urgency of the takeoff side group of energy-storage devices; and a hydrodynamic clutch device, which has at least one pump wheel and a turbine wheel to form a hydrodynamic circuit, the intermediate transmission element being connected nonrotatably to the turbine wheel and the takeoff-side transmission element being connected nonrotatably to the takeoff side component;

wherein the drive-side group of energy-storage devices has first energy-storage devices exhibiting the same characteristic deflection curve with a single section;

wherein the takeoff side group of energy-storage devices has first energy-storage devices exhibiting the same characteristic deflection curve with a single section; and wherein the stiffness of the first energy-storage devices of the drive-side group of energy-storage devices is different from the stiffness of the first energy-storage devices of the takeoff side group of energy-storage devices so that a predetermined stiffness ratio of the stiffness of the first energy-storage devices of the drive-side group of energy-storage devices to the stiffness of the first energy-storage devices of the takeoff-side group of energy-storage devices is in the range of 0.7-1.2.

* * * * *